(12) United States Patent
Suzuki

(10) Patent No.: US 9,679,357 B2
(45) Date of Patent: Jun. 13, 2017

(54) IMAGE PROCESSING DEVICE, AND AN IMAGE PROCESSING METHOD

(71) Applicant: SAMSUNG DISPLAY CO., LTD., Yongin-si, Gyeonggi-Do (KR)

(72) Inventor: Kenji Suzuki, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/952,363

(22) Filed: Nov. 25, 2015

(65) Prior Publication Data

US 2016/0155215 A1    Jun. 2, 2016

(30) Foreign Application Priority Data

Nov. 27, 2014 (JP) ................................. 2014-240236

(51) Int. Cl.
*G06K 9/00* (2006.01)
*G06T 3/40* (2006.01)

(52) U.S. Cl.
CPC ............ *G06T 3/4007* (2013.01); *G06T 3/403* (2013.01)

(58) Field of Classification Search
CPC ..... G06T 5/002; G06T 7/0085; G06T 3/4007; G06T 5/20; G06T 2207/20024; G06T 2207/20076; G06T 2207/20192; G06T 3/403
USPC ................................. 382/165, 199, 260, 266
See application file for complete search history.

(56) References Cited

U.S. PATENT DOCUMENTS

| 6,943,807 | B2 | 9/2005 | Xavier | |
| 7,406,208 | B2* | 7/2008 | Chiang | G06T 5/003 |
| | | | | 382/199 |
| 7,792,384 | B2* | 9/2010 | Gomi | G06T 3/403 |
| | | | | 382/261 |
| 8,081,256 | B2* | 12/2011 | Lertrattanapanich | H04N 7/012 |
| | | | | 348/448 |
| 8,358,307 | B2* | 1/2013 | Shiomi | G06T 3/40 |
| | | | | 345/428 |
| 8,428,382 | B2* | 4/2013 | Sato | A45D 44/005 |
| | | | | 382/254 |

FOREIGN PATENT DOCUMENTS

| EP | 1359763 | 11/2003 |
| JP | 2005332130 | 12/2005 |

(Continued)

*Primary Examiner* — Kanjibhai Patel
(74) *Attorney, Agent, or Firm* — F. Chau & Associates, LLC

(57) ABSTRACT

An image processing device includes an edge direction determination unit, a filter coefficient calculation unit, and a filter processing unit. The edge direction determination unit determines a first edge direction of an edge including a first pixel of input image data, and calculates a first reliability value of the determined edge direction corresponding to the first pixel. The filter coefficient calculation unit calculates a first filter coefficient corresponding to the first pixel, a second filter coefficient corresponding to a second pixel, and a third filter coefficient corresponding to a third pixel at least based on the first reliability value of the first edge direction. The filter processing unit performs filter processing on the input image data on the basis of the calculated first through third filter coefficients, and outputs output image data.

20 Claims, 16 Drawing Sheets

(56) References Cited

FOREIGN PATENT DOCUMENTS

| JP | 2008054267 | 3/2008 |
| JP | 2008252449 | 10/2008 |
| JP | 2009301583 | 12/2009 |
| JP | 2011028640 | 2/2011 |
| JP | 2011070595 | 4/2011 |

* cited by examiner

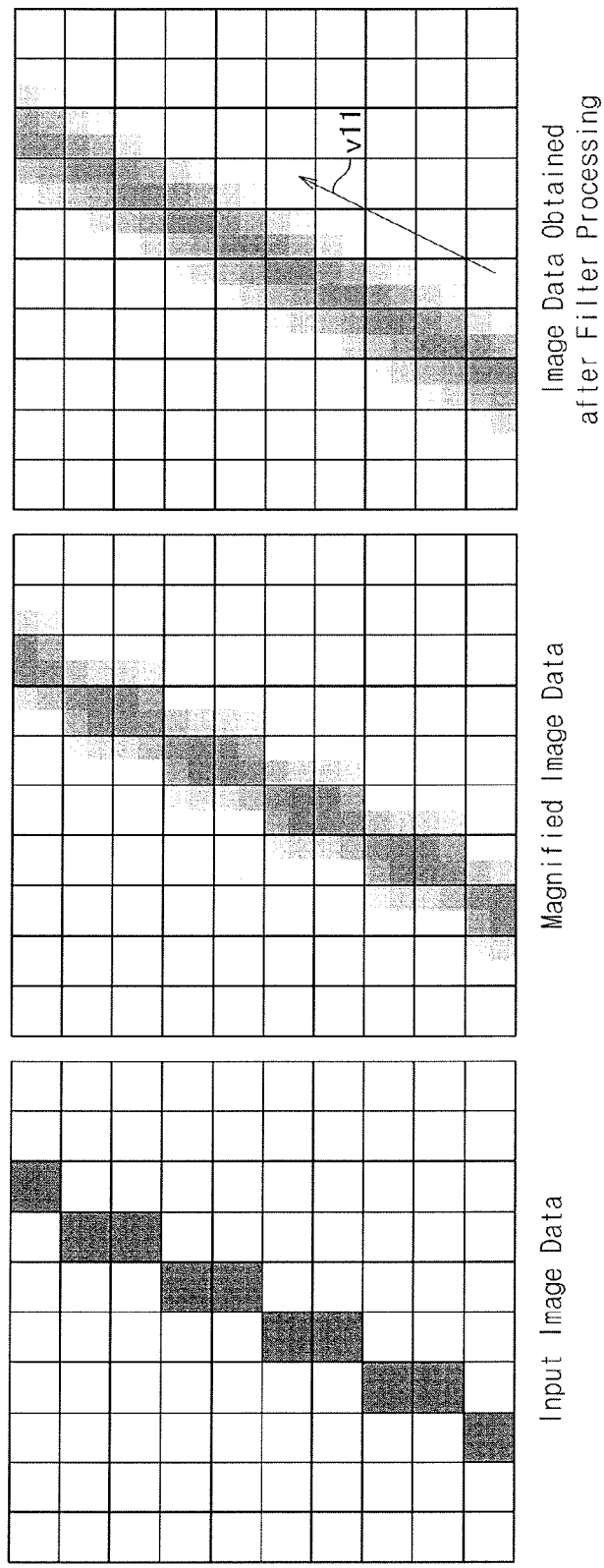

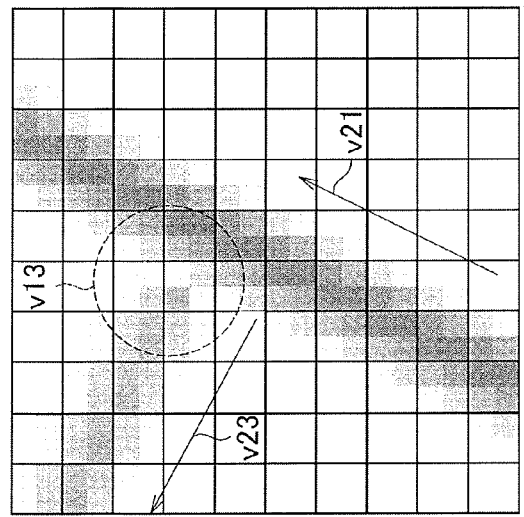
FIG. 3A Input Image Data
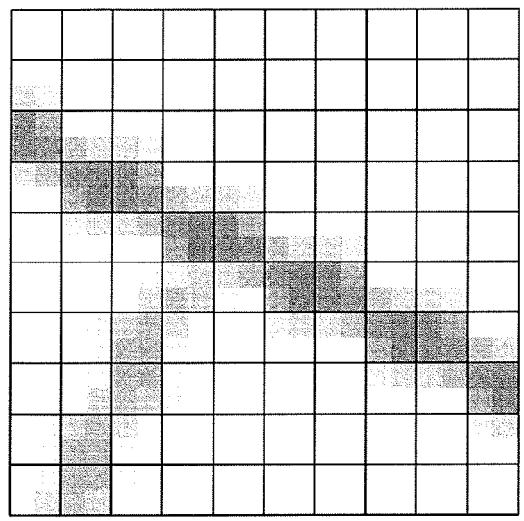
FIG. 3B Magnified Image Data
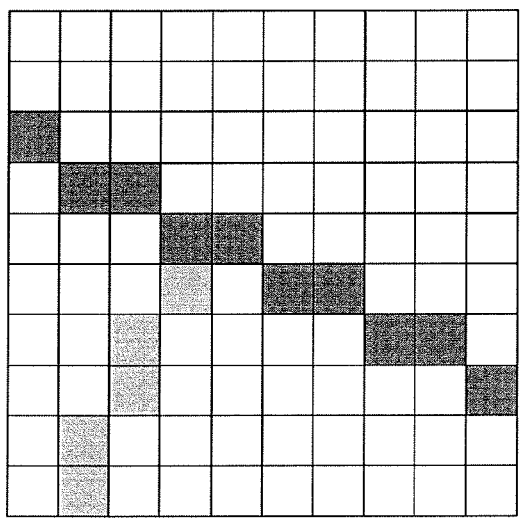
FIG. 3C Image Data Obtained after Filter Processing

FIG. 5

| A | B | C |
|---|---|---|
| D | E | F |
| G | H | I |

Input Image Data

| A1 | A2 | B1 | B2 | C1 | C2 |
|----|----|----|----|----|----|
| A3 | A4 | B3 | B4 | C3 | C4 |
| D1 | D2 | E1 | E2 | F1 | F2 |
| D3 | D4 | E3 | E4 | F3 | F4 |
| G1 | G2 | H1 | H2 | I1 | I2 |
| G3 | G4 | H3 | H4 | I3 | I4 |

Magnified Image Data

| No. | Edge Direction |
|---|---|
| 1 | 90° |
| 2 | 72° |
| 3 | 63° |
| 4 | 45° |
| 5 | 27° |
| 6 | 18° |
| 7 | 0° |
| 8 | −18° |
| 9 | −27° |
| 10 | −45° |
| 11 | −63° |
| 12 | −72° |

FIG. 10 dir(0, 0) : Edge direction of pixel of interest
rel(0, 0) : Reliability of edge direction for pixel of interest

| dir(-2,-2) rel(-2,-2) | dir(-1,-2) rel(-1,-2) | dir(0,-2) rel(0,-2) | dir(1,-2) rel(1,-2) | dir(2,-2) rel(2,-2) |
|---|---|---|---|---|
| dir(-2,-1) rel(-2,-1) | dir(-1,-1) rel(-1,-1) | dir(0,-1) rel(0,-1) | dir(1,-1) rel(1,-1) | dir(2,-1) rel(2,-1) |
| dir(-2,0) rel(-2,0) | dir(-1,0) rel(-1,0) | dir(0,0) rel(0,0) | dir(1,0) rel(1,0) | dir(2,0) rel(2,0) |
| dir(-2,1) rel(-2,1) | dir(-1,1) rel(-1,1) | dir(0,1) rel(0,1) | dir(1,1) rel(1,1) | dir(2,1) rel(2,1) |
| dir(-2,2) rel(-2,2) | dir(-1,2) rel(-1,2) | dir(0,2) rel(0,2) | dir(1,2) rel(1,2) | dir(2,2) rel(2,2) |

IMAGE PROCESSING DEVICE, AND AN IMAGE PROCESSING METHOD

CROSS-REFERENCE TO RELATED APPLICATIONS

This U.S. non-provisional patent application claims priority under 35 U.S.C. §119 to Japanese Patent Application No. 2014-240236, filed on Nov. 27, 2014, the disclosure of which is incorporated by reference herein in its entirety.

TECHNICAL FIELD

The present inventive concept relates to an image processing device; more particularly, an image processing method, and a recording medium storing a program for performing the image processing method.

DISCUSSION OF THE RELATED ART

In displaying technology, much advance has been adopted to increase the display resolution, for example, full high definition (FHD, 1920×1080) and ultra high definition (UHD, 3840×2160) displays have grown in popularity.

When a low-resolution image is magnified (e.g., scaled up) to display at high-resolution, jaggies or artifact may be magnified and became noticeable when interpolation processing is performed on an image, artifacts may be quantized due to mis-interpolation.

SUMMARY

According to an embodiment of the present inventive concept, an image processing device is provided. The image processing device includes an edge direction determination unit, a filter coefficient calculation unit, and a filter processing unit. The edge direction determination unit is configured to determine a first edge direction of an edge including a first pixel of input image data by calculating a first correlation value between a first block including the first pixel and at least one second block positioned along the first edge direction with respect to the first pixel, calculating a second correlation value between the first block and at least one third block positioned along a second edge direction with respect to the first pixel, and determining the first edge direction based on a comparison result of the first correlation value with the second correlation value. The filter coefficient calculation unit is configured to calculate a first filter coefficient bT corresponding to the first pixel, a second filter coefficient bL corresponding to a second pixel of the input image data, and a third filter coefficient bR corresponding to a third pixel of the input image data at least based on a first reliability value of the first edge direction. The filter processing unit is configured to perform filter processing on the input image data on the basis of the calculated first through third filter coefficients, and output output image data.

Locations of the first block and the at least one second block may be preset in the input image data for the first edge direction. The edge direction determination unit may calculate pixel value differences between pixels of the first block and pixels of the at least one second block, and calculate the first correlation value on the basis of the pixel value differences.

The edge direction determination unit may calculate the first correlation value on the basis of an average of the pixel value differences calculated between the pixels of the first block and the pixels of the at least one second block.

The edge direction determination unit may determine the first edge direction when the first correlation value is smaller than the second correlation value.

The edge direction determination unit may calculate the first reliability value on the basis of the first correlation value.

The edge direction determination unit may compensate for the first reliability value of the first edge direction on the basis of a first weight and a second weight. The first weight may be calculated based on a difference between the first edge direction of the edge including the first pixel and a third edge direction of an edge including a peripheral pixel of the first pixel. The peripheral pixel may be disposed within a predetermined distance with respect to the first pixel. The second weight may be calculated according to a distance between the first pixel and the peripheral pixel.

The filter coefficient calculation unit may calculate the second filter coefficient bL based on the first reliability value, a second reliability value of a fourth edge direction of an edge including the second pixel, and a third weight corresponding to the second pixel. The filter coefficient calculation unit may calculate the third filter coefficient bR based on the first reliability value, a third reliability value of a fifth edge direction of an edge including the third pixel, and a fourth weight corresponding to the third pixel. The first pixel, the second pixel, and the third pixel may be positioned along the first edge direction. The second pixel may be disposed in an opposite direction to the third pixel with respect to the first pixel.

The filter coefficient calculation unit may calculate the third weight on the basis of a difference between the first edge direction and the fourth edge direction.

The filter coefficient calculation unit may calculate a fourth weight on the basis of a difference between the first edge direction and the fifth edge direction.

The filter coefficient calculation unit may calculate the first filter coefficient bT, the second filter coefficient bL, and the third filter coefficient bR on the basis of the following equation. relT may be the first reliability value of the first edge direction, weiL may be the third weight, relL may be the second reliability value of the fourth edge direction, weiR may be the fourth weight, and relR may be the third reliability value of the fifth edge direction, $$bT = 1 + relT$$

$$bL = relT \times weiL \times relL$$

$$bR = relT \times weiR \times relR.$$

The filter processing unit may calculate a pixel value Yout of a pixel of the output image data corresponding to the first pixel of the input image data on the basis of a pixel value YT of the first pixel, a pixel value YL of the second pixel, a pixel value YR of the third pixel, the first filter coefficient bT, the second filter coefficient bL, and the third filter coefficient bR using the following equation, $$Yout = \frac{bL \times YL + bT \times YT + bR \times YR}{bL + bT + bR}.$$

The edge direction determination unit may calculate the first reliability value of the first edge direction on the basis of a correlation value between a luminance component of a pixel of the first block and a luminance component of a pixel of the at least one second block. The filter processing unit may perform the filter processing on a luminance component of the input image data on the basis of the first through third filter coefficients calculated for the first pixel.

The image processing device may further include an edge enhancement processing unit configured to perform edge enhancement processing on the input image data.

The filter processing unit may perform the filter processing on image data on which the edge enhancement processing has been performed by the edge enhancement processing unit.

The edge enhancement processing unit may perform the edge enhancement processing on image data on which the filter processing has been performed by the filter processing unit.

The edge enhancement processing unit may perform the edge enhancement processing on a luminance component of the input image data.

The image processing device may further include a magnification processing unit. The magnification processing unit may be configured to convert first image data having a first resolution into second image data having a second resolution higher than the first resolution, and output the second image data as the input image data.

According to an embodiment of the present inventive concept, a method of processing an image is provided. The method includes determining a first edge direction of an edge including a first pixel of input image data, calculating a first filter coefficient corresponding to first pixel, a second filter coefficient corresponding to a second pixel of the input image data, and a third filter coefficient corresponding to a third pixel of the input image data at least based on a first reliability value of the first edge direction, and performing filter processing on the input image data on the basis of the calculated first through third filter coefficients calculated for the first pixel to generate output image data. The first edge direction is determined by calculating a first correlation value between a first block including the first pixel and at least one second block positioned along the first edge direction with respect to the first pixel, calculating a second correlation value between the first block including the first pixel and at least one third block positioned along a second edge direction with respect to the first pixel, and determining the first edge direction based on a comparison result of the first correlation value with the second correlation value.

According to an embodiment of the present inventive concept, an image processing device is provided. The image processing device includes an edge direction determination unit, a filter coefficient calculation unit, and a filter processing unit. The edge direction determination unit determines a first edge direction of an edge including a first pixel of input image data, a second edge direction of an edge including a second pixel of the input image data, and a third edge direction of an edge including a third pixel of the input image data, and calculates a first reliability value of the first edge direction, a second reliability value of the second edge direction, and a third reliability value of the third edge direction. The first pixel, the second pixel, and the third pixel are positioned along the first edge direction, and the second pixel is disposed in an opposite direction to the third pixel with the first pixel. The filter coefficient calculation unit calculates first through third filter coefficients. The first filter coefficient is calculated based on the first reliability value. The second filter coefficient is calculated based on the first reliability value, the second reliability value, and a first weight corresponding to the second pixel. The third filter coefficient is calculated based on the first reliability value, the third reliability value, and a second weight corresponding to the third pixel. The filter processing unit performs filter processing on the input image data on the basis of the calculated first through third filter coefficients, and outputs output image data. The edge direction determination unit calculates a correlation value between a first block including the first pixel and at least one second block positioned along the first edge direction with respect to the first pixel, and determines the first edge direction based on the calculated correlation value. The edge direction determination unit calculates the correlation value on the basis of an average of luminance value differences between pixels of the first block and pixels of the at least one second block.

BRIEF DESCRIPTION OF THE FIGURES

Exemplary embodiments of the present inventive concept will be more clearly understood from the following detailed description taken in conjunction with the accompanying drawings, in which:

FIGS. 2A and 2C are diagrams illustrating an example of image processing for reducing jaggies in magnified image data;

FIGS. 3A to 3C are diagrams illustrating an example of image processing for reducing jaggies in magnified image data;

FIG. 5 is a diagram illustrating an example of magnifying input image data according to an embodiment of the present inventive concept;

FIG. 10 is a diagram illustrating an operation of compensating for a reliability value of an edge direction of an edge corresponding to a pixel of interest according to an embodiment of the present inventive concept;

DETAILED DESCRIPTION OF THE EMBODIMENTS

Figure 1:
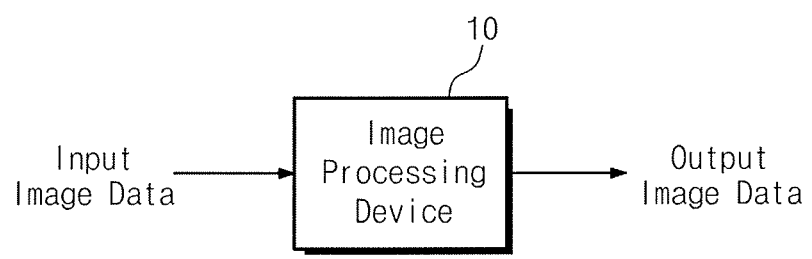
FIG. 1 is a block diagram illustrating an image processing device according to an embodiment of the present inventive concept.

Hereinafter, the present inventive concept will be described in detail with reference to the accompanying drawings. In the drawings, the size and relative sizes of layers and regions may be exaggerated for clarity. Like numbers may refer to like elements throughout the specification and drawings. All the elements throughout the specification and drawings may be circuits. Each of an edge direction (e.g., dir(x, y)) and an edge direction difference (e.g., delta Dir (x, y), deltaDirR, detlaDirL) may have a unit of degrees.

An image processing device 10 will be described with reference to FIG. 1. FIG. 1 is a block diagram illustrating an image processing device 10. Referring to FIG. 1, the image processing device 10 may receive input image data, may perform magnification processing on the input image data, and may output the magnified input image data as output image data. For example, the image processing device 10 may receive input image data of full high definition (FHD) and may generate output image data of ultra high definition (UHD). Here, the image processing device 10 may perform the magnification processing on the input image data based on interpolation such as bilinear interpolation, bicubic interpolation, or the like. In addition, the image processing device 10 may perform image processing for reducing jaggies in the magnified image data.

FIGS. 2A to 2C are diagrams illustrating an example of image processing for reducing jaggies in magnified image data. FIGS. 2A to 2C illustrate that an edge of an image displayed through pixels extends in a diagonal direction. The diagonal direction is different from a direction in which pixels are arranged. Provided that pixels are arranged in a matrix along a first direction and a second direction perpendicular to the first direction, the diagonal direction represents a direction other than the first and second directions.

FIG. 2A illustrates input image data that has not undergone the magnification processing. FIG. 2B illustrates magnified image data obtained by performing the magnification processing on the input image data of FIG. 2A. FIG. 2C illustrates filtered image data obtained by performing filter processing on the magnified image data to reduce jaggies.

As illustrated in FIG. 2B, in the case where the magnification processing is performed on the input image data, jaggies of an edge of an image extending in the diagonal direction are magnified. Therefore, the jaggies on the edge of the image may become more prominent in the magnified image data.

To reduce jaggies from being magnified, the image processing device 10 may detect an edge direction v11 of the image, and may perform interpolation processing for reducing the jaggies by adjusting a coefficient of a two-dimensional (2D) filter, and thus, smoothing processing is performed on the image along the edge direction v11.

After the image processing (e.g., filter processing) for reducing the jaggies is performed on the magnified image data, artifacts that are not present in the input image data may appear in the filtered image data, as shown in FIG. 2C.

FIGS. 3A to 3C are diagrams illustrating an example of image processing for reducing jaggies. FIGS. 3A to 3C illustrate a case where artifacts appear in filtered image data after the image processing (e.g., the filter processing) is performed on the magnified image data. Each image data illustrated in FIGS. 3A to 3C include two edges respectively extending in a first diagonal direction and a second diagonal direction crossing the first diagonal direction. The two edges may intersect with each other. FIG. 3A illustrates input image data before the magnification processing is performed thereon. FIG. 3B illustrates magnified image data after the magnification processing is performed on the input image data of FIG. 3A. FIG. 3C illustrates filtered image data after the filtering processing is performed on the magnified image data to reduce jaggies.

Input image data, magnified image data, and filtered image data of FIGS. 3A to 3C may be obtained in substantially the same manner as those described above with reference to FIGS. 2A to 2C.

Referring to FIGS. 3A to 3C, the image processing device 10 detects each of two edge directions of an image displayed on a screen. For example, the image processing device 10 may detect a first edge direction v21 and a second edge direction v23. The image processing device 10 may adjust a coefficient of a 2D filter so that smoothing processing is performed along the first edge direction v21 and the second edge direction v23. Therefore, the image processing device 10 may perform interpolation processing for reducing the jaggies displayed on the edges of the image. Here, in the case described with reference to FIGS. 3A to 3C, mis-interpolation (e.g., an error in interpolation) may occur on a first portion v13 where edges intersect with each other. Thus, the edge extending along the second edge direction v23 may appear to be cut. This may be understood as an example of the artifacts. The artifacts may occur because a degree of filter processing varies depending on a luminance difference between adjacent pixels. For example, the artifact may occur since the filter processing more strongly affects the edge extending in the first edge direction v21 than the edge extending in the second edge direction v23. This is because the edge extending in the first edge direction v21 has a larger luminance difference between adjacent pixels than the edge extending in the second edge direction v23.

The image processing device 10 according to an exemplary embodiment of the present inventive concept has a configuration and a structure for reducing occurrence of mis-interpolation where edges intersect with each other and performing image processing for reducing jaggier. Hereinafter, the image processing device 10 according to an exemplary embodiment of the present inventive concept will be described in more detail below.

Figure 4:
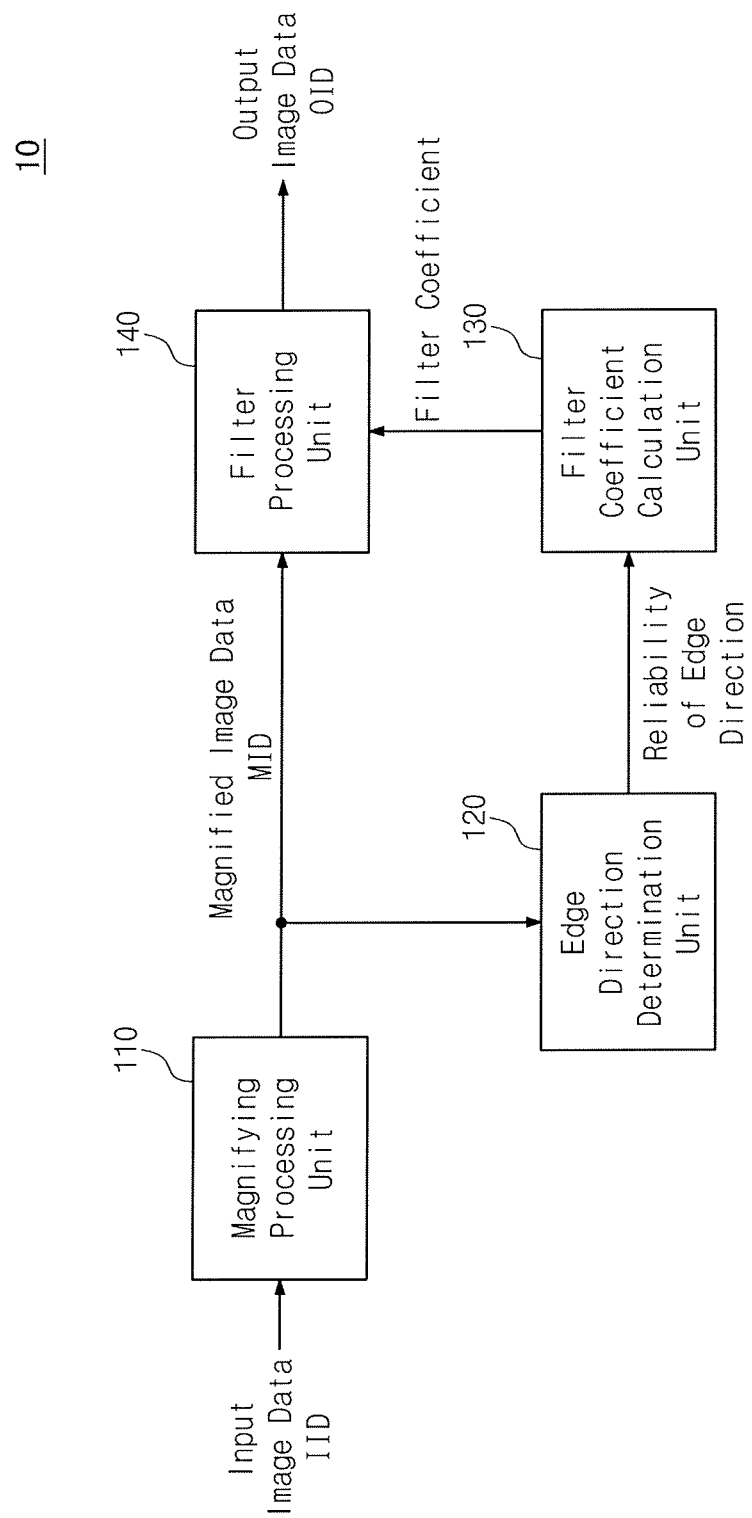
FIG. 4 is a block diagram illustrating an image processing device according to an embodiment of the present inventive concept.

The configuration of the image processing device 10 according to an embodiment of the present inventive concept will be described with reference to FIG. 4. FIG. 4 is a block diagram illustrating an image processing device 10 according to an embodiment of the present inventive concept.

As illustrated in FIG. 4, the image processing device 10 includes a magnification processing unit 110, an edge direction determination unit 120, a filter coefficient calculation unit 130, and a filter processing unit 140.

The magnification processing unit 110 may perform magnification processing on the input image data IID on the basis of interpolation processing. For example, the magnification processing unit 110 may perform the magnification processing on the input image data IID on the basis of bilinear interpolation, bicubic interpolation, or the like. Accordingly, the magnification processing unit 110 magnifies the input image data IID into magnified image data MID having a higher resolution than that of the input image data IID.

FIG. 5 is a diagram illustrating an example of magnifying input image data IID by a magnification processing unit according to an embodiment of the present inventive concept. A method of calculating pixel values (e.g., luminance values) obtained after magnifying the input image data IID on the basis of the bilinear interpolation are described with reference to FIG. 5. Referring to FIG. 5, the magnified image data MID through the magnification processing unit 110 has a resolution that is four times higher than that of the input image data IID. Further, in FIG. 5, a pixel (e.g., a pixel indicated by a reference sign E) of the input image data IID corresponds to a pixel of interest to be processed. The pixels of the input image data HD indicated by reference signs A to D and F to I correspond to peripheral pixels. Pixel values of the peripheral pixels A to D and F to I may be used in performing interpolation processing on the pixel of interest E. The pixels of the magnified image data MID indicated by reference signs E1 to E4 correspond to pixels obtained by magnifying the pixel of interest E of the input image data IID.

In the case of magnifying the input image data IID on the basis of the bilinear interpolation, each of pixel values (e.g., luminance values) $I_{E1}$ to $I_{E4}$ of the pixels E1 to E4 of the magnified image data MID is calculated on the basis of at least one of pixel values $I_A$ to $I_I$ of the pixels A to I of the input image data HD as expressed by Equation (1) below.

$$I_{E1}=0.0625 \times I_A + 0.1875 \times I_B + \times 0.1875 \times I_D + 0.5625 \times I_E$$

$$I_{E2}=0.0625 \times I_C + 0.1875 \times I_B + \times 0.1875 \times I_F + 0.5625 \times I_E$$

$$I_{E3}=0.0625 \times I_G + 0.1875 \times I_D + \times 0.1875 \times I_H + 0.5625 \times I_E$$

$$I_{E4}=0.0625 \times I_I + 0.1875 \times I_F + \times 0.1875 \times I_H + 0.5625 \times I_E \quad (1)$$

Although it has been described with reference to FIG. 5 that the input image data IID is magnified into the magnified image data MID having a resolution that is four times higher than that of the input image data IID, the degree of magnification of the present inventive concept is not limited thereto. In addition, a method of magnifying the input image data IID is not limited to the bilinear or bicubic interpolation.

As described above, the magnification processing unit 110 generates the magnified image data MID having a higher resolution than that of the input image data IID. The magnification processing unit 110 outputs the magnified image data MID to the edge direction determination unit 120 and the filter processing unit 140.

Figure 6:
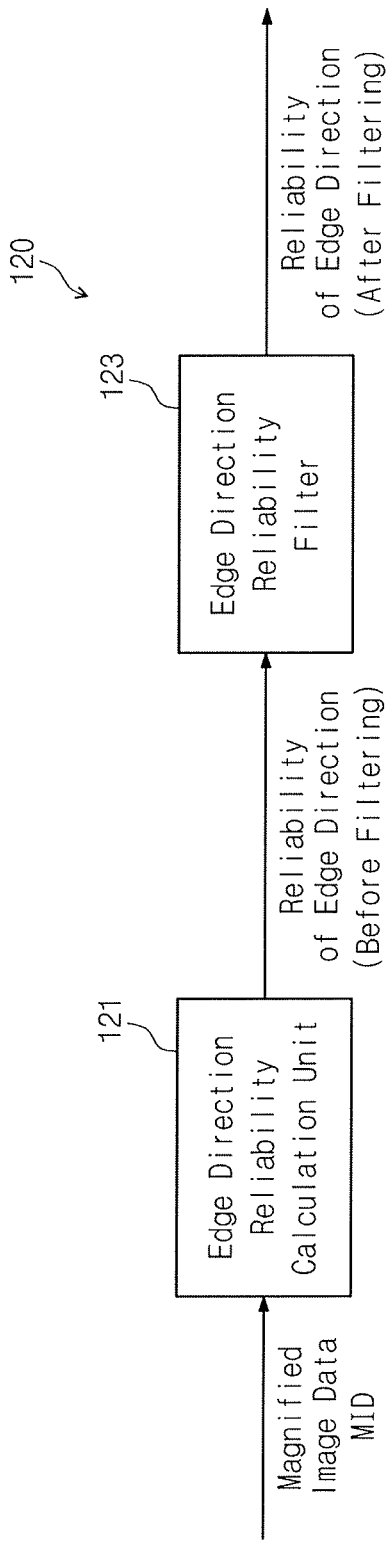
FIG. 6 is a block diagram illustrating an edge direction determination unit according to an embodiment of the present inventive concept.

The edge direction determination unit 120 will be described in detail below. FIG. 6 is a block diagram illustrating the edge direction determination unit 120 according to an embodiment of the present inventive concept. As illustrated in FIG. 6, the edge direction determination unit 120 includes an edge direction reliability calculation unit 121 and an edge direction reliability filter 123.

The edge direction reliability calculation unit 121 receives the magnified image data MID from the magnification processing unit 110. The edge direction reliability calculation unit 121 sequentially uses (e.g., sets) each pixel of the magnified image data MID as a pixel of interest, determines an edge direction of an edge that includes the pixel of interest on the basis of a pixel value (e.g., a luminance value) of the pixel of interest and pixel values (e.g., luminance values) of peripheral pixels of the pixel of interest, and calculates a reliability value of the detected edge direction. An exemplary operation performed by the edge direction reliability calculation unit 121 will be described in more detail below.

Figure 7:
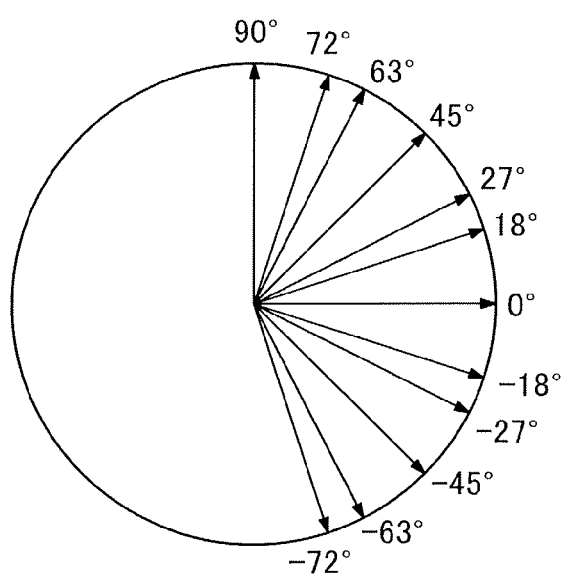
FIG. 7 is a diagram illustrating edge direction candidates according to an embodiment of the present inventive concept.

The edge direction reliability calculation unit 121 determines an edge direction of an edge that includes the pixel of interest among preset edge direction candidates. FIG. 7 illustrates an example of the edge direction candidates. As illustrated in FIG. 7, twelve edge direction candidates ranged between 90 degrees and −72 degrees may be set (e.g., preset) in the image processing device 10. However, the edge direction candidates of FIG. 7 are merely an example. For example, the number of the edge direction candidates or configuration of each edge direction candidate is not limited to that of the example illustrated in FIG. 7.

Figure 8:
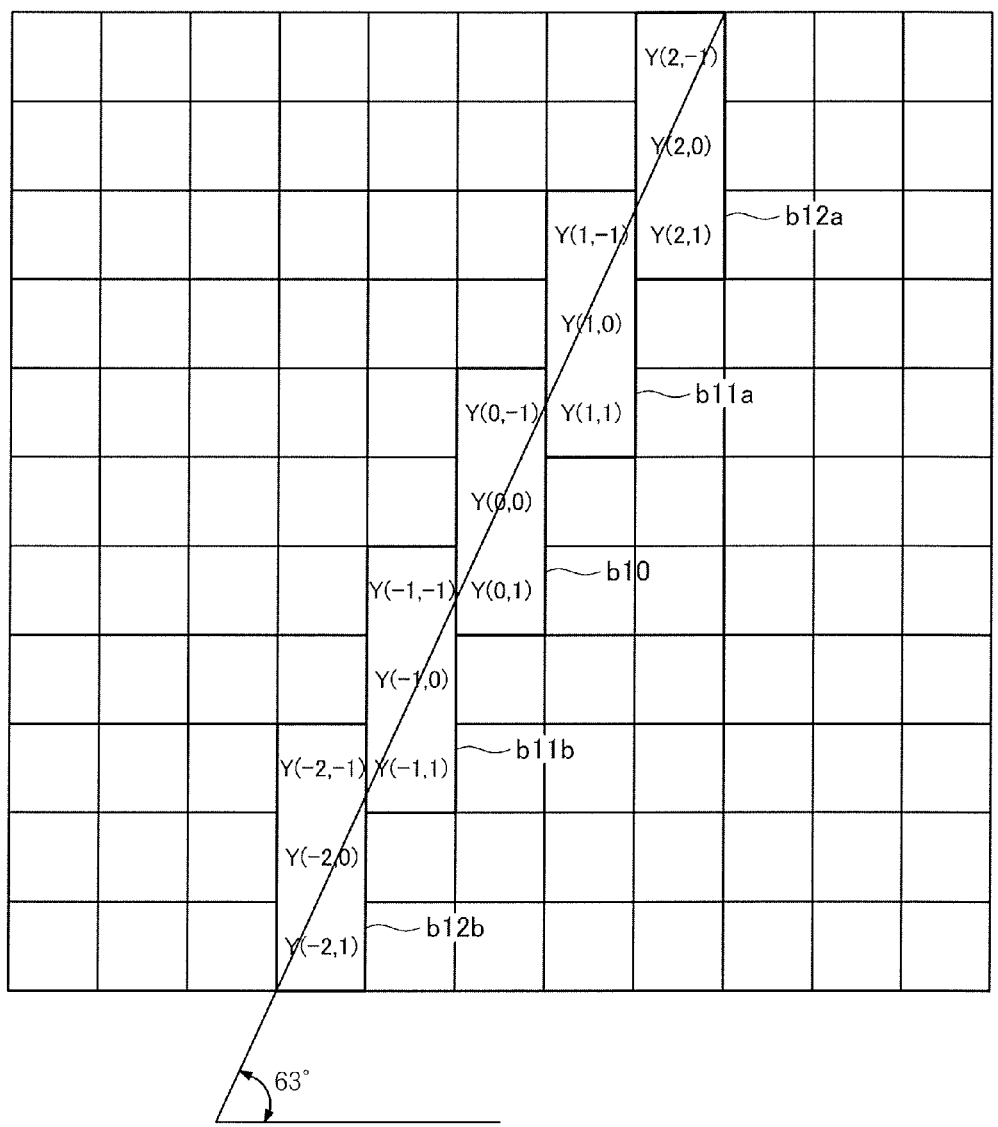
FIG. 8 is a diagram illustrating determination of an edge direction and calculation of a reliability value of the determined edge direction according to an embodiment of the present inventive concept.
Figure 9:
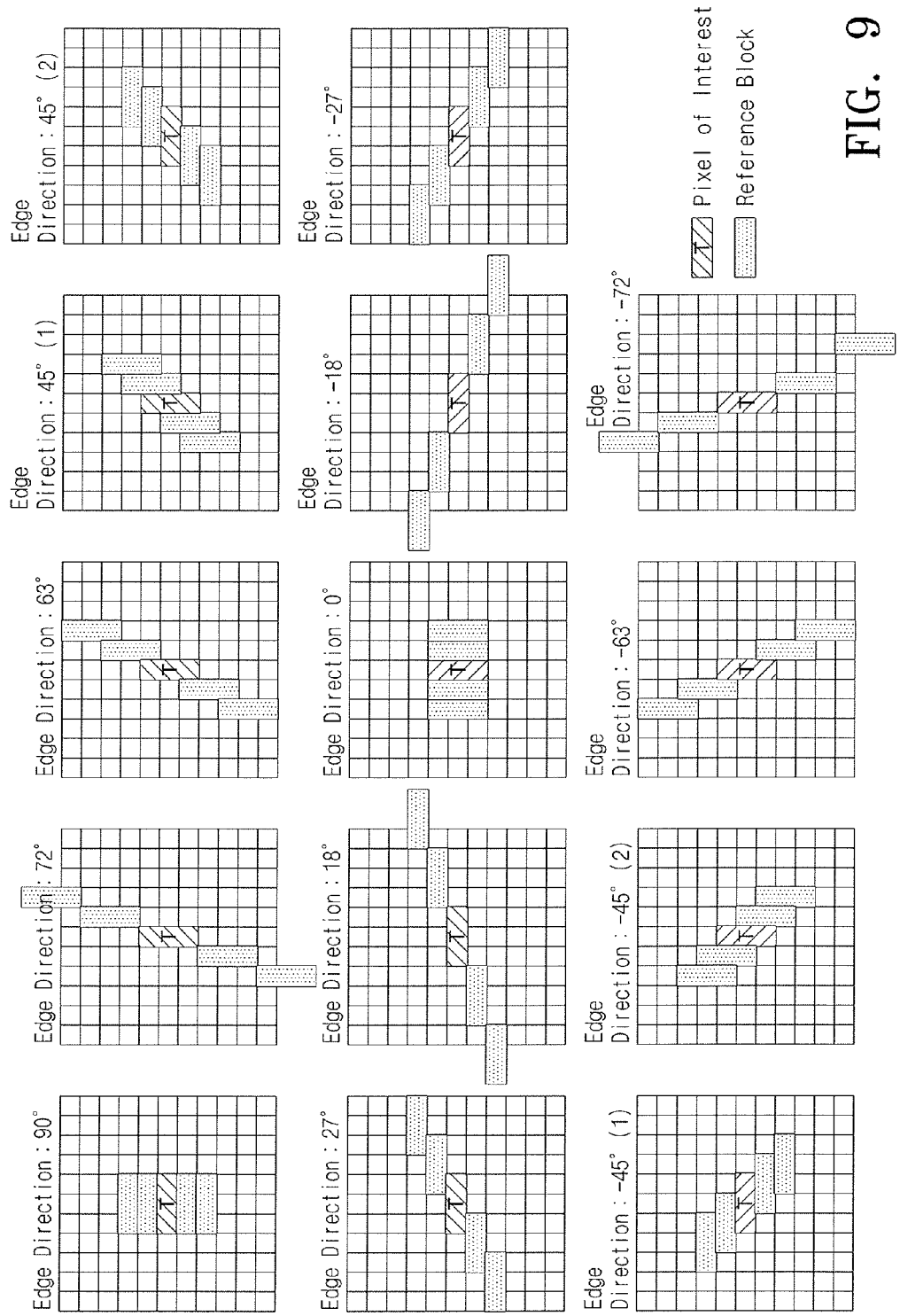
FIG. 9 is a diagram illustrating a configuration of a block of interest and reference blocks for each of edge direction candidates according to an embodiment of the present inventive concept.

FIG. 8 is a diagram illustrating determination of an edge direction and calculation of a reliability value of the determined edge direction according to an exemplary embodiment of the present inventive concept. FIG. 9 is a diagram illustrating a configuration of a block of interest and reference blocks for each of edge direction candidates according to an exemplary embodiment of the present inventive concept.

Referring to FIGS. 8 and 9, an operation of determining an edge direction of an edge including a pixel of interest using the edge direction reliability calculation unit 121 and an operation of calculating the reliability value of the determined edge direction using the edge direction reliability calculation unit 121.

For each of the edge direction candidates illustrated in FIG. 7, the edge direction reliability calculation unit 121 calculates a correlation value between a pixel value of a pixel of interest and a pixel value of each of peripheral pixels predetermined for each edge direction candidate. For example, FIG. 8 is a diagram illustrating calculating of the correlation value with respect to a 63-degree edge direction candidate among the edge direction candidates. Hereinafter, it is assumed that the coordinates of the pixel of interest are (0, 0) and the coordinates of the peripheral pixels are defined relatively to the pixel of interest for the sake of description on the operation of the edge direction reliability calculation unit 121. In addition, a pixel value (e.g., a luminance value) of a pixel of coordinates (i, j) is referred to as Y(i, j). For example, the pixel value of the pixel of interest (0, 0) is Y(0, 0).

In the image processing device 10 according to an embodiment of the present inventive concept, a block of interest including at least one pixel including the pixel of interest and a plurality of reference blocks adjacent to the block of interest are preset for each of the edge direction candidates. Referring to FIG. 8, a reference sign b10 indicates the block of interest, and reference signs b11a, b11b, b12a, and b12b indicate the reference blocks.

The block of interest and the reference blocks are preset in the magnified image data MID for each of the edge direction candidates so that the block of interest and the reference blocks include pixels (e.g., a pixel of interest or peripheral pixels) positioned on an edge that includes the pixel of interest and extends in an edge direction according to the each edge direction candidate.

For example, referring to FIG. 8, the block of interest b10 and the reference blocks b11a, b11b, b12a, and b12b are set (e.g., preset) so that the blocks (e.g., the block of interest b10, and the reference blocks b11a, b11b, b12a, and b12b)

include pixels (e.g., the pixel of interest (0, 0) or peripheral pixels (1, 0) and (2, 0)) positioned on an edge that includes the pixel of interest and extends in a 63-degree edge direction candidate.

For example, the peripheral pixels respectively having coordinates (1, 0) and (2, 0) are positioned in a 63-degree edge direction with respect to the pixel of interest (0, 0). Here, the reference block b11a is set to include the peripheral pixel (1, 0), and the reference block b12a is set to include the peripheral pixel (2, 0).

In addition, the peripheral pixels respectively having coordinates (−1, 0) and (−2, 0) are positioned opposite to the peripheral pixels (1, 0) and (2, 0) with respect to the pixel of interest (0, 0). Here, the reference block b11b is set to include the peripheral pixel (−1, 0), and the reference block b12b is set to include the peripheral pixel (−2, 0).

Referring to FIG. 8, the block of interest b10 extends upwards and downwards from the pixel of interest (0, 0) by a single pixel. For example, the block of interest b10 includes the pixel of interest (0, 0) and peripheral pixels (0, 1) and (0, −1). The peripheral pixel (0, 1) is positioned at an upward direction of the pixel of interest (0, 0) and under the pixel of interest (0, 0), and the peripheral pixel (0, −1) is positioned at a downward direction of the pixel of interest (0, 0). In addition, the reference block b11a extends upwards and downwards from the peripheral pixel (1, 0) by a single pixel. The reference block b12a extends upwards and downwards from the peripheral pixel (2, 0) by a single pixel. The reference block b11b extends upwards and downwards from the peripheral pixel (−1, 0) by a single pixel. The reference block b12b extends upwards and downwards from the peripheral pixel (−2, 0) by a single pixel.

Hereinafter, the number of reference blocks positioned along an edge direction at one side with respect to the block of interest b10 may be referred to as a "block number". For example, referring to FIG. 8, two reference blocks b11a and b12a are present at an upper right side with respect to the block of interest b10. Therefore, referring to FIG. 8, the block number may be 2.

In addition, in each of the block of interest and the reference blocks, the number of pixels positioned in one of an upper direction, a lower direction, a left direction, or a right direction with respect to a pixel on an edge that extends in a direction of an edge direction candidate may be referred to as a "block length". For example, referring to FIG. 8, the block of interest b10 extends upwards and downwards from the pixel of interest (0, 0) by a single pixel, and the reference block b11a extends upwards and downwards from the peripheral pixel (1, 0) by a single pixel. Therefore, referring to FIG. 8, the block length may be 1. However, a block length of the present inventive concept is not limited thereto.

For each of edge direction candidates, the edge direction reliability calculation unit 121 calculates a correlation value between pixels in the block of interest and pixels in each reference block preset with respect to the block of interest. Here, provided that a pixel value (e.g., a luminance value) of a pixel (i, j) is Y(i, j), the number of blocks is w, and a block length is ld, a correlation value cor(d) for each edge direction candidate (e.g., for each angle) is calculated on the basis of Equation (2) below.

$$\mathrm{cor}(d) = \sum_{-1 \times w \le i \le w, -1 \times ld \le j \le ld} |Y(0, j) - Y(i, j)| \times \frac{1}{w \times 2 \times (ld \times 2 + 1)} \quad (2)$$

As described above, the edge direction reliability calculation unit 121 calculates luminance differences between the pixels of the block of interest and the pixels of each reference block preset with respect to the block of interest. For example, the edge direction reliability calculation unit 121 calculates the correlation value cor(d) on the basis of an average of the calculated luminance differences.

FIG. 9 illustrates a configuration of the block of interest and the reference blocks for each edge direction candidate (e.g., for each angle). For example, referring to FIG. 9, the block number w is 2 and the block length ld is 1. However, a block number or a block length of the present inventive concept is not limited thereto.

FIG. 9 illustrates two cases for each of an edge direction candidate of a 45-degree direction and an edge direction candidate of a −45-degree direction among the edge direction candidates. For each of the edge direction candidates (e.g., edge direction candidates respectively having a 45-degree direction and a −45-degree direction) in which two configurations of the block of interest and the reference blocks are present, and the edge direction reliability calculation unit 121 may calculate the correlation value cor(d) for each of the two configurations, and may select a smaller correlation value between the calculated correlation values.

For each of the edge direction candidates respectively having a 0-degree direction and a 90-degree direction among the edge direction candidates, the reference blocks are positioned closer to the block of interest in comparison with the other edge direction candidates. Thus, a correlation values cor(d) of each of the edge direction candidates respectively having a 0-degree direction and a 90-degree may be smaller than those of the other candidates. The edge direction reliability calculation unit 121 may assign a weight to the correlation value cor(d) calculated for each edge direction candidate. The weight assigned to the correlation value cor(d) may be determined according to a location relationship (e.g., a distance) between the block of interest and each of the reference blocks for each edge direction candidate.

The arrangements (e.g., configurations) of the blocks of interest and the reference blocks illustrated in FIGS. 8 and 9 are merely examples, and the arrangements of the blocks of interest and the reference blocks are not limited thereto. In addition, the block number and the block length are not limited to those described with respect to FIGS. 8 and 9, and may be modified in various manners. For example, the block number and the block length may be set in different manners for each edge direction candidate.

The edge direction reliability calculation unit 121 calculates the correlation value cor(d) for each edge direction candidate (e.g., for each edge direction angle), and determines an edge direction candidate (e.g., an edge direction angle) in which the correlation value cor(d) is minimized. The edge direction candidate dir in which the correlation value cor(d) is minimized is expressed as Equation (3) below.

$$\mathrm{dir} = \underset{d \in DIR}{\mathrm{argmin}}\, \mathrm{cor}(d) \quad DIR = \{90, 72, \ldots, -72\} \quad (3)$$

Provided that the minimum value of the correlation value cor(d), which may be referred to as a "minimum correlation value", is corMin, the minimum correlation value corMin is expressed as Equation (4) below.

$$corMin = cor(dir) \quad (4)$$

In addition, in the case where the edge direction candidate dir in which the correlation value cor(d) is minimized is used as an edge direction corresponding to the pixel of interest (0, 0), the edge direction reliability calculation unit 121 calculates a reliability value rel of the edge direction on the basis of the minimum correlation value corMin. The reliability value rel of the edge direction is calculated on the basis of Equation (5) below.

$$\text{rel} = 1 - \frac{corMin}{256} \quad (5)$$

As described above, the edge direction reliability calculation unit 121 sequentially uses (e.g., sets) each pixel of the magnified image data MID as a pixel of interest, determines an edge direction of an edge corresponding to each pixel of interest, and calculates the reliability value of the edge direction. In addition, the edge direction reliability calculation unit 121 outputs, for each pixel of the magnified image data MID, the determined edge direction and the calculated reliability value of the edge direction to the edge direction reliability filter 123.

From the edge direction reliability calculation unit 121, the edge direction reliability filter 123 receives the determined edge direction and the calculated reliability value of the edge direction for each pixel of the magnified image data MID. The edge direction reliability filter 123 compensates for the reliability value of the edge direction of an edge corresponding to a pixel of interest on the basis of a location relationship (e.g., a distance) between the pixel of interest and peripheral pixels of the pixel of interest. An exemplary operation performed by the edge direction reliability filter 123 will be described in more detail below.

FIG. 10 is a diagram illustrating an operation of compensating for a reliability value of an edge direction of an edge corresponding to a pixel of interest according to an exemplary embodiment of the present inventive concept. FIG. 10 illustrates edge directions of edges, respectively corresponding to a pixel of interest and peripheral pixels of the pixel of interest, and reliability values of the edge directions. For example, referring to FIG. 10, the peripheral pixels are defined by a 5×5 window in which the pixel of interest is centered. For the sake of description, it is assumed that the coordinates of the pixel of interest are (0, 0), and the coordinates of the peripheral pixels are defined relatively to the pixel of interest. In addition, an edge direction of an edge corresponding to a pixel of the coordinates (i, j) may be referred to as dir(i, j), and the reliability value of the edge direction d(i, j) may be referred to as rel(i, j). For example, an edge direction of an edge corresponding to the pixel of interest (0, 0) is dir(0, 0), and a reliability value of the edge direction dir(0, 0) is rel(0, 0).

For each of the peripheral pixels, the edge direction reliability filter 123 calculates a difference between the edge direction of an edge corresponding to the pixel of interest and the edge direction of an edge corresponding to the peripheral pixel. Here, provided that the edge direction of the edge corresponding to the pixel of interest of the coordinates (0, 0) is dir(0, 0) and the edge direction of the edge corresponding to the peripheral pixel of the coordinates (x, y) is dir(x, y), an edge direction difference deltaDir(x, y) corresponding to the peripheral pixel (x, y) is calculated on the basis of Equation (6) below.

$$deltaDir0(x, y) = |dir(0, 0) - dir(x, y)| \quad (6)$$

$$deltaDir(x, y) = \begin{cases} deltaDir0(x, y) & deltaDir0(x, y) \le 90 \\ deltaDir0(x, y) - 90 & deltaDir0(x, y) > 90 \end{cases}$$

The edge direction reliability filter 123 calculates a weight weiD(x, y) corresponding to the peripheral pixel (x, y) on the basis of the edge direction difference deltaDir(x, y) calculated for the peripheral pixel (x, y). Hereinafter, the weight weiD(x, y) corresponding to the peripheral pixel (x, y) on the basis of the edge direction difference deltaDir(x, y) may be referred to as an edge-direction-difference-based weight weiD(x, y). The edge-direction-difference-based weight weiD(x, y) is calculated on the basis of Equation (7) below. In Equation (7), alphaD is a preset coefficient.

$$weiD(x,y) = \text{alpha}D \times \text{delta}Dir(x,y) \quad (7)$$

Hereinafter, the edge direction difference deltaDir(x, y) may be referred to as "deltaDir" in the case where the edge direction difference deltaDir(x, y) is generalized for all peripheral pixels. In addition, the edge-direction-difference-based weight weiD(x, y) may be referred to as "weiD" in the case where the edge-direction-difference-based weight weiD(x, y) is generalized for all peripheral pixels.

Figure 11:
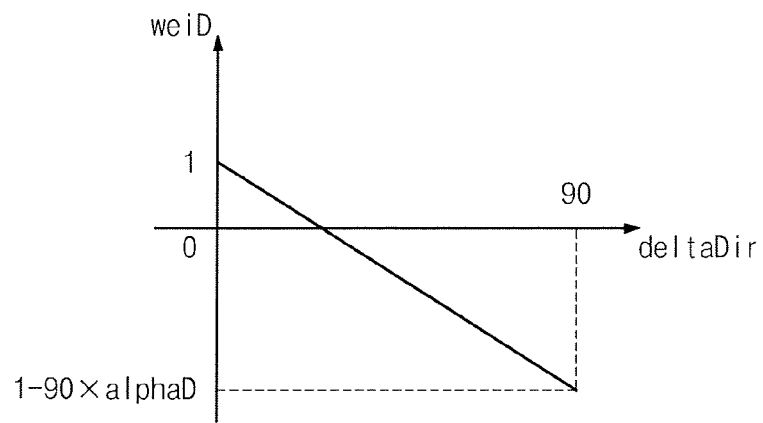
FIG. 11 is a diagram illustrating a relationship between an edge direction difference based on filter processing by an edge direction reliability filter and a weight based on the edge direction difference according to an embodiment of the present inventive concept.

FIG. 11 is a diagram illustrating a relationship between an edge direction difference based on filter processing by an edge direction reliability filter 123 and an edge-direction-difference-based weight according to an exemplary embodiment of the present inventive concept.

Referring to FIG. 11, the relationship between the edge direction difference (e.g., deltaDir) and the edge-direction-difference-based weight weiD is expressed on the basis of Equation (7). In FIG. 11, the horizontal axis represents the edge direction difference deltaDir, and the vertical axis represents the edge-direction-difference-based weight weiD.

For each of the peripheral pixels, the edge direction reliability filter 123 calculates a weight (e.g., weiG(x, y)) according to a distance between the corresponding pixel of interest and the peripheral pixel. Here, a weight weiG(x, y) according to a distance between the pixel of interest and the peripheral pixel (x, y) is calculated on the basis of Equation (8) below. In Equation (8), sigmaG is a preset coefficient.

$$weiG(x, y) = \exp\left(-1 \times \frac{x^2 + y^2}{2 \times sigmaG^2}\right) \quad (8)$$

As described above, the edge direction reliability filter 123 calculates the weights weiD(x, y) and weiG(x, y) for each of the peripheral pixels. In addition, the edge direction reliability filter 123 compensates for the edge direction reliability rel(0, 0) corresponding to the pixel of interest (0, 0) on the basis of the weights weiD(x, y) and weiG(x, y) calculated for each of the peripheral pixels. Here, the compensated edge direction reliability value relFlt(0, 0) corresponding to the pixel of interest (0, 0) is calculated on the basis of Equation (9) below.

$$relFlt0(x, y) = \sum_{-2 \le x \le 2, -2 \le y \le 2} (rel(x, y) \times weiD(x, y) \times weiG(x, y))$$

$$relFlt(x, y) = \begin{cases} relFlt0(x, y) & relFlt0(x, y) \ge 0 \\ 0 & relFlt0(x, y) < 0 \end{cases}$$

As described above, the edge direction reliability filter 123 compensates for the edge direction reliability value corresponding to each pixel of interest of the magnified image data MID. In addition, for each pixel of the magnified image data MID, the edge direction reliability filter 123 outputs an edge direction corresponding to the pixel and a compensated reliability value of the edge direction to the filter coefficient calculation unit 130, as illustrated in FIG. 4. The filter coefficient calculation unit 130 will be described in more detail below. From the edge direction reliability filter 123, the filter coefficient calculation unit 130 receives the edge direction calculated for each pixel of the magnified image data MID and the reliability value of the edge direction. The filter coefficient calculation unit 130 calculates a filter coefficient, e.g., which corresponds to the pixel of interest, on the basis of the edge direction for each pixel of the magnified image data MID, and the reliability value of the edge direction. The calculation of the filter coefficient by the filter coefficient calculation unit 130 will be described in more detail below.

The filter coefficient calculation unit 130 sequentially uses (e.g., sets) each pixel of the magnified image data MID as a pixel of interest, determines a plurality of tap pixels from the pixel of interest and peripheral pixels of the pixel of interest on the basis of the edge direction of the edge corresponding to the pixel of interest.

In the image processing device 10 according to an embodiment of the present inventive concept, a relative location relationship (e.g., a distance) of each of the plurality of tap pixels with respect to the pixel of interest may be predetermined for each edge direction candidate.

Figure 12:
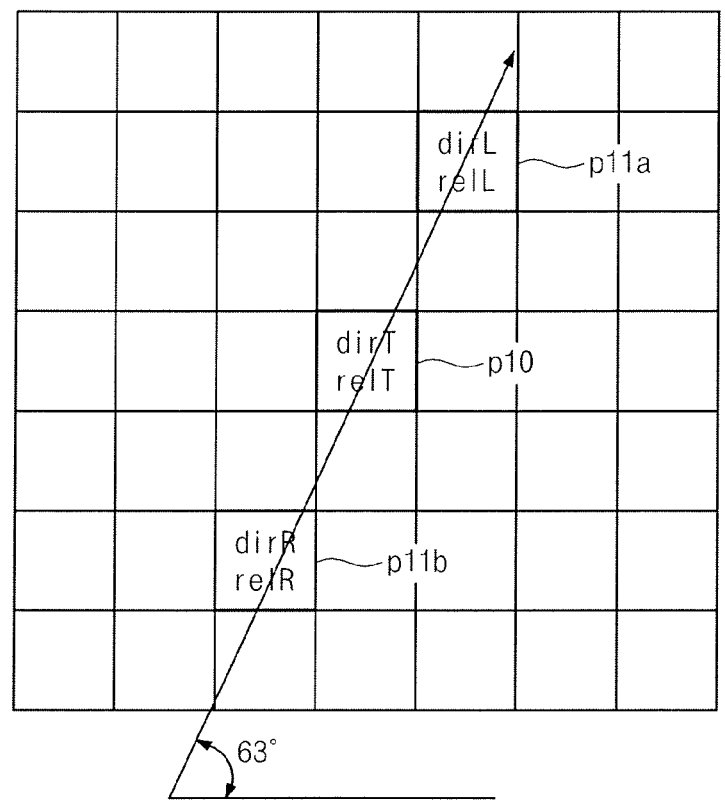
FIG. 12 is a diagram illustrating an operation of calculating a filter coefficient according to an embodiment of the present inventive concept.

FIG. 12 is a diagram illustrating an operation of calculating a filter coefficient according to an embodiment of the present inventive concept. The calculation of the filter coefficient may be performed by the filter coefficient calculation unit 130. In addition, referring to FIG. 12, an edge direction candidate having a 63-degree direction is used in calculating the filter coefficient.

Referring to FIG. 12, a pixel of interest (e.g., a first pixel) p10 corresponds to a part of the plurality of tap pixels. Thus, the tap pixel p10 may be referred to as a "tap T". In addition, peripheral pixels p11a and p11b correspond to parts of the plurality of tap pixels. Thus, the tap pixel (e.g., a second pixel) p11a may be referred to as a "tap L", and the tap pixel (e.g., a third pixel) p11b may be referred to as a "tap R".

Referring to FIG. 12, the tap pixels p11a and p11b positioned on an edge that includes the pixel of interest p10 and extends in a 63-degree direction are respectively set as the taps L and R.

For example, the tap pixels (e.g., P10, P11a, and P11b) respectively corresponding to the taps T, L, and R are preset for each edge direction candidate so that the tap pixels are positioned on an edge that includes the pixel of interest (e.g., P10) in a direction (e.g., 63-degree direction) of the edge direction candidate. Referring back to FIG. 12, pixels (e.g., P11a and P11b) closest (e.g., adjacent) to the tap T (e.g., the pixel of interest p10) among pixels positioned along the edge direction are respectively set as the taps L and R. As illustrated in FIG. 12, the tap L (e.g., the tap pixel p11a) and the tap R (e.g., the tap pixel p11b) are positioned in an opposite direction to each other with respect to the tap T (e.g., the pixel of interest p10).

As described above, the filter coefficient calculation unit 130 determines the plurality of tap pixels corresponding to the pixel of interest, and calculates the filter coefficient corresponding to the pixel of interest on the basis of the edge direction of an edge corresponding to each of the plurality of tap pixels (e.g., the taps T, L, and R) and the reliability value of the edge direction.

For example, the filter coefficient calculation unit 130 calculates a difference between the edge direction corresponding to the tap T and the edge direction corresponding to the tap L or R. For example, provided that the edge direction corresponding to the tap T is dirT and the edge direction corresponding to the tap L is dirL, an edge direction difference deltaDirL between the tap T and the tap L is expressed as Equation (10a) below.

$$deltaDir0L = |dirT - dirL| \quad (10a)$$
$$deltaDirL = \begin{cases} deltaDir0L & deltaDir0L \leq 90 \\ deltaDir0L - 90 & deltaDir0L > 90 \end{cases}$$

In addition, provided that the edge direction corresponding to the tap T is dirT and the edge direction corresponding to the tap R is dirR, an edge direction difference deltaDirR between the tap T and the tap R is expressed as Equation (10b) below.

$$deltaDir0R = |dirT - dirR|$$
$$deltaDirR = \begin{cases} deltaDir0R & deltaDir0R \leq 90 \\ deltaDir0R - 90 & deltaDir0R > 90 \end{cases}$$

In addition, the filter coefficient calculation unit 130 calculates a weight weiL on the basis of the edge direction difference deltaDirL between the tap T and the tap L as expressed by Equation (11a) below. In Equation (11a), alpha is a preset coefficient.

$$wei0L = 1 - alpha \times deltaDirL \quad (11a)$$
$$weiL = \begin{cases} wei0L & wei0L \geq 0 \\ 0 & wei0L < 0 \end{cases}$$

In addition, the filter coefficient calculation unit 130 calculates a weight weiR on the basis of the edge direction difference deltaDirR between the tap T and the tap R as expressed by Equation (11b) below. In Equation (11b), alpha is the same as the coefficient alpha of Equation (11a).

$$wei0R = 1 - alpha \times deltaDirR \quad (11b)$$
$$weiR = \begin{cases} wei0R & wei0R \geq 0 \\ 0 & wei0R < 0 \end{cases}$$

Figure 13:
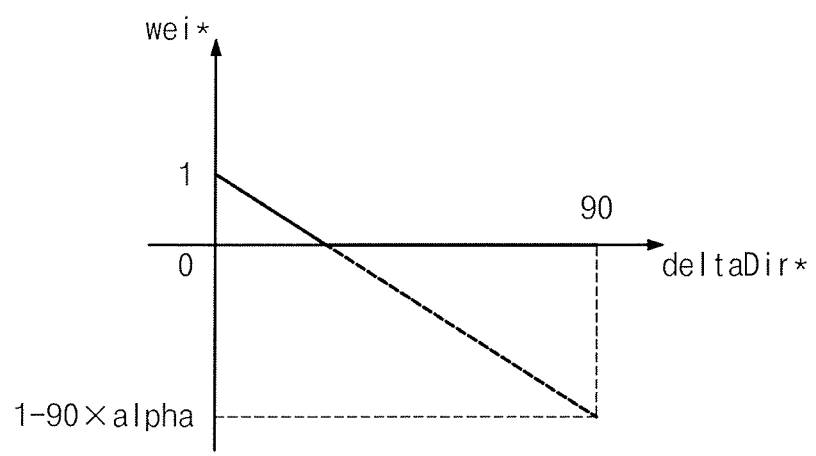
FIG. 13 is a diagram illustrating a relationship between an edge direction difference based on processing by a filter coefficient calculation unit and a weight based on the edge direction difference according to an embodiment of the present inventive concept.

FIG. 13 is a diagram illustrating a relationship between an edge direction difference based on processing by a filter coefficient calculation unit 130 and a weight based on the edge direction difference according to an embodiment of the present inventive concept.

Referring to FIG. 13, the relationship between the edge direction difference deltaDirL and the weight weiL based on the edge direction difference deltaDirL or the relationship between the edge direction difference deltaDirR and the weight weiR based on the edge direction difference deltaDirR is expressed on the basis of Equations (11a) and (11b). In FIG. 13, the horizontal axis represents the edge direction difference deltaDir*. The vertical axis represents the weight wei* based on the edge direction difference. In FIG. 13, the edge direction difference deltaDir* corresponds to the edge direction difference deltaDirL or deltaDirR, and the weight wei* corresponds to the weight weiL or weiR. For example, in FIG. 13, if the horizontal axis represents the edge direction difference deltaDirL, the vertical axis represents the weight weiL. If the horizontal axis represents the edge direction difference deltaDirR, the vertical axis represents the weight weiR.

In addition, the filter coefficient calculation unit 130 calculates each of filter coefficients bT, bL, and bR on the basis of at least one of reliability values of the edge directions (e.g., dirT, dirL, and dirR) respectively corresponding to the taps T, L, and R and the weights weiL and weiR respectively corresponding to the taps L and R. Here, provided that the reliability values of the edge directions (e.g., dirT, dirL, and dirR) respectively corresponding to the taps T, L, and R are relT, relL, and relR respectively, the filter coefficients bT, bL, and bR are calculated on the basis of Equation (12) below.

$$bT=1+relT$$

$$bL=relT \times weiL \times relL$$

$$bR=relT \times weiR \times relR$$

Figure 14:
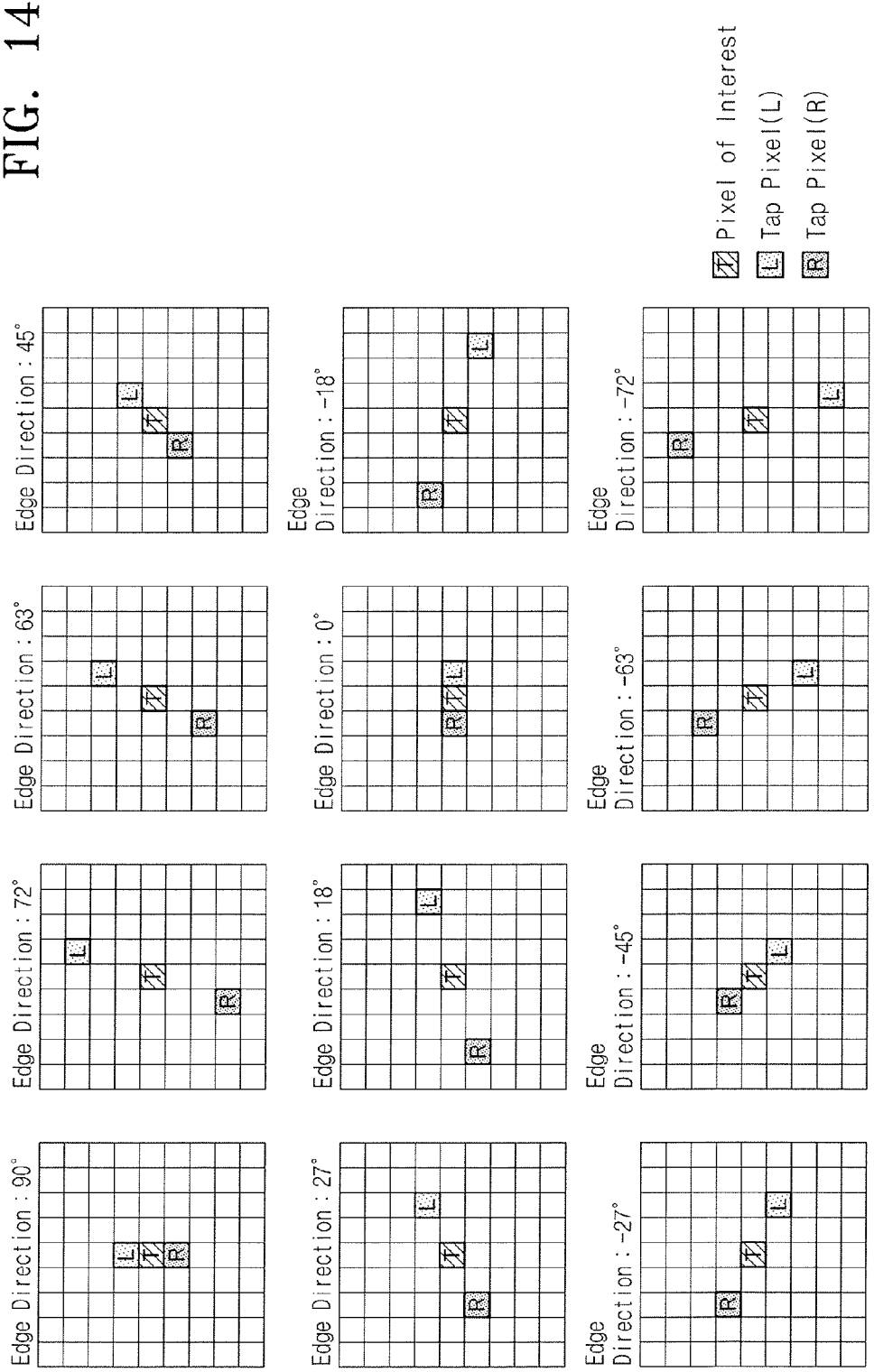
FIG. 14 is a diagram illustrating a plurality of tap pixels defined for each of edge direction candidates according to an embodiment of the present inventive concept.

FIG. 14 is a diagram illustrating a plurality of tap pixels T, L, and R defined for each of edge direction candidates (e.g., for each angle) according to an embodiment of the present inventive concept.

For example, referring to FIG. 14, the number of taps (e.g., tap pixels) is 3. However, the number of taps of the present inventive concept is not limited thereto.

In case of edge direction candidates of a 0-degree direction and a 90-degree direction, jaggies might not occur, and thus, the filter coefficients bL and bR may be set at 0 to prevent filter processing by the filter processing unit 140 from being performed. In case of edge direction candidates of a 45-degree direction and a −45-degree direction, a probability of jaggies occurring may be relatively low, and thus, the filter coefficients bL and bR are set at to prevent the filter processing of the filter processing unit 140 from being performed.

In an embodiment, the number of taps is set at 3, but the number of taps of the present inventive concept is not limited thereto. For example, the number of taps may be an odd number equal to or larger than 3. As described above, the filter coefficient calculation unit 130 calculates filter coefficients bT, bL, and bR for each pixel of the magnified image data MID. In addition, the filter coefficient calculation unit 130 outputs the calculated filter coefficients bT, bL, and bR to the filter processing unit 140. The filter coefficient calculation unit 130 may transfer information with respect to a plurality of tap pixels (e.g., the taps L and R) to the filter processing unit 140. The plurality of tap pixels may be pixels determined on the basis of an edge direction of an edge corresponding to each pixel of the magnified image data MID. Accordingly, the filter processing unit 140 may recognize a location of each of the plurality of tap pixels determined for each pixel of the magnified image data MID.

The filter processing unit 140 may perform filter processing for reducing jaggies, on the magnified image data MID output from the magnification processing unit 110.

The filter processing unit 140 receives the magnified image data MID from the magnification processing unit 110. The filter processing unit 140 receives the filter coefficients bT, bL, and bR calculated for each pixel of the magnified image data MID from the filter coefficient calculation unit 130. Furthermore, the filter processing unit 140 may acquire the information with respect to a plurality of tap pixels determined on the basis of an edge direction of an edge corresponding to each pixel of the magnified image data MID.

The filter processing unit 140 performs the filter processing on each pixel of the magnified image data MID using the filter coefficients bT, bL, and bR corresponding to the corresponding pixel. Here, provided that a pixel value (e.g., a luminance value) of a pixel to be processed is YT and respective pixel values (e.g., luminance values) of the taps L and R positioned along an edge direction of the corresponding pixel are YL and YR, a pixel value Yout of the corresponding pixel obtained by performing the filter processing thereon using the filter coefficients bT, bL, and bR is expressed as Equation (13) below.

$$Yout = \frac{bL \times YL + bT \times YT + bR \times YR}{bL + bT + bR} \quad (13)$$

As described above, the filter processing unit 140 performs the filter processing on each pixel of the magnified image data MID to generate and output the output image data OID.

Although the edge direction determination unit 120, the filter coefficient calculation unit 130, and the filter processing unit 140 are described to be arranged at the rear of the magnification processing unit 110, an exemplary embodiment of the present inventive concept is not limited to the configuration described above. For example, the edge direction determination unit 120, the filter coefficient calculation unit 130, and the filter processing unit 140 may be arranged at the front of the magnification processing unit 110.

A configuration of the image processing device 10 according to an embodiment of the present inventive concept has been described with reference to FIGS. 4 to 14.

The aforementioned operations of the image processing device 10 or method may be performed by a program executed by a central processing unit (CPU) or a processor to operate elements of the image processing device 10. This program may be configured to be executed through an operating system (OS) installed in the device. A storage location of the program is not limited if it is readable by a device (e.g., the image processing device 10) including an element for performing the aforementioned operations. For example, the program may be stored in a recording medium (e.g., computer readable recording medium such as a compact disc, a memory, or the like) accessible from the outside of the device. In this case, the recording medium in which the program is stored may be allowed to be accessed by the device so that the CPU or the processor executes the program.

Figure 15:
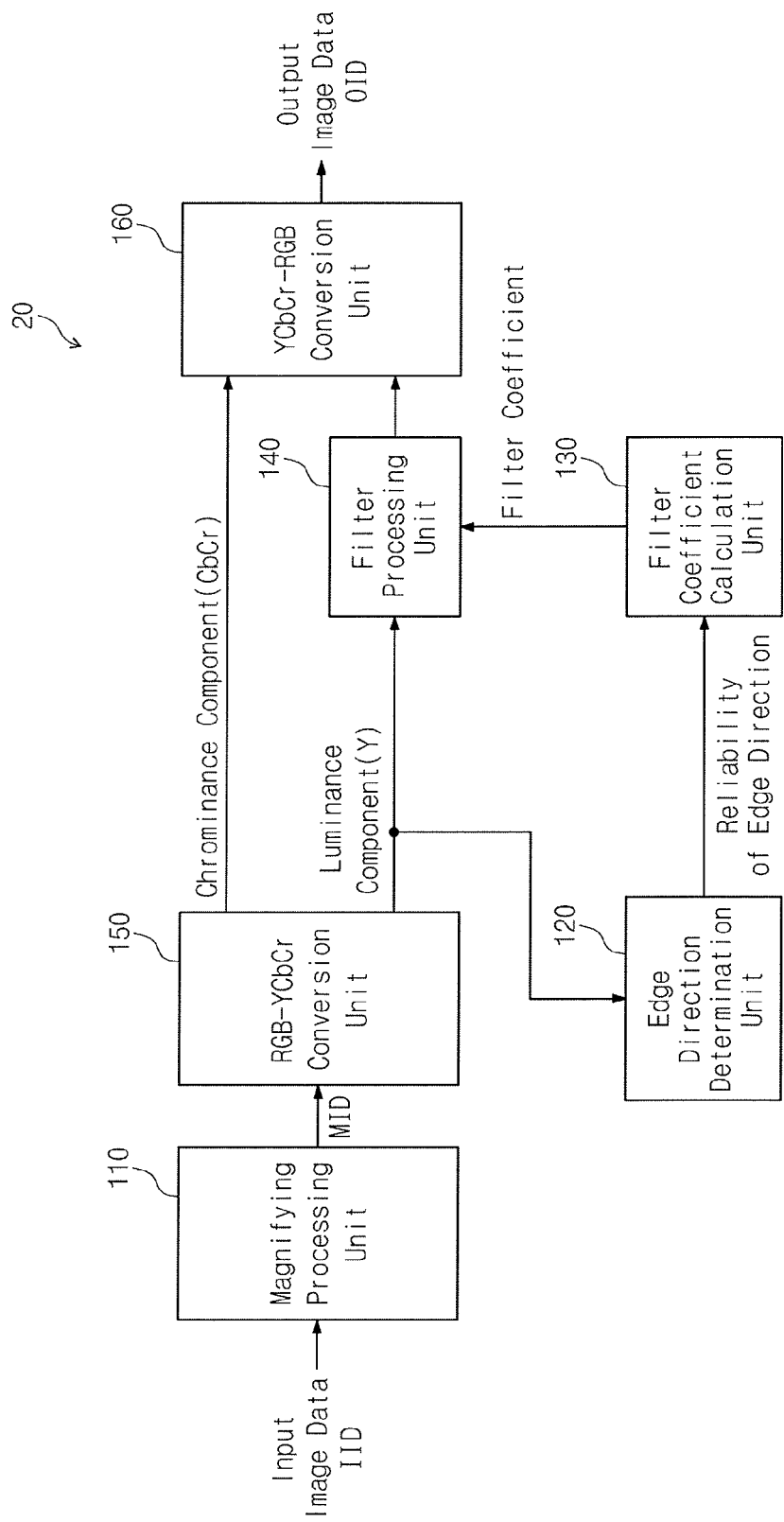
FIG. 15 is a block diagram illustrating an image processing device according to an embodiment of the present inventive concept.

An image processing device 20 according to an embodiment of the present inventive concept will be described with reference to FIG. 15. FIG. 15 is a block diagram illustrating an image processing device according to an embodiment of the present inventive concept. Hereinafter, descriptions of the image processing device 20 of FIG. 15 will be focused on differences from the image processing device 10 of FIG. 4. Thus, duplicate descriptions will be omitted.

In addition to the image processing device 10 of FIG. 4, referring to FIG. 15, the image processing device 20 further includes an RGB-YCbCr conversion unit 150 and a YCbCr-RGB conversion unit 160. The RGB-YCbCr conversion unit 150 may convert an RGB component of each pixel of image data into a luminance component Y and a chrominance component CbCr. The RGB-YCbCr conversion unit 150 receives magnified image data MID from a magnification processing unit 110, and converts the RGB component of each pixel of the magnified image data MID into the luminance component Y and the chrominance component CbCr. The RGB-YCbCr conversion unit 150 outputs the converted luminance component Y for each pixel to an edge direction determination unit 120 and a filter processing unit 140, and outputs the converted chrominance component CbCr to the YCbCr-RGB conversion unit 160.

The edge direction determination unit 120 may determine an edge direction and may calculate a reliability value of the determined edge direction using the luminance component Y. The filter coefficient calculation unit 130 calculates a filter coefficient on the basis of the edge direction and the reliability value of the edge direction.

The filter processing unit 140 performs the filter processing for reducing jaggies on the luminance component Y of each pixel using the filter coefficient through the filter coefficient calculation unit 130. In addition, the filter processing unit 140 outputs a luminance component, on which the filter processing has been performed, to the YCbCr-RGB conversion unit 160.

The YCbCr-RGB conversion unit 160 receives the chrominance component CbCr for each pixel of the magnified image data MID from the RGB-YCbCr conversion unit 150. From the filter processing unit 140, the YCbCr-RGB conversion unit 160 receives the luminance component that has undergone the filter processing for reducing the jaggies. The YCbCr-RGB conversion unit 160 converts the chrominance component CbCr and the luminance component that has undergone the filter processing into an RGB component, and thus, output image data OID is generated.

An image processing device (e.g., 20 of FIG. 15) according to an embodiment of the present inventive concept may be configured so that the determination of an edge direction, the calculation of the reliability value of the edge direction, the calculation of a filter coefficient, and the filter processing based on the filter coefficient may be performed on the luminance component Y.

An image processing device 30 according to an embodiment of the present inventive concept will be described with reference to FIG. 16. The image processing device 30 reduces jaggies in magnified image data MID based on the filter processing by the filter processing unit 140. Due to the filter processing by the filter processing unit 140, a pixel value change (e.g., a luminance change) between pixels adjacent to an edge is decreased, and thus, the edge is blurred. The image processing device 30 may have a function of enhancing an edge in the magnified image data MID.

Figure 16:
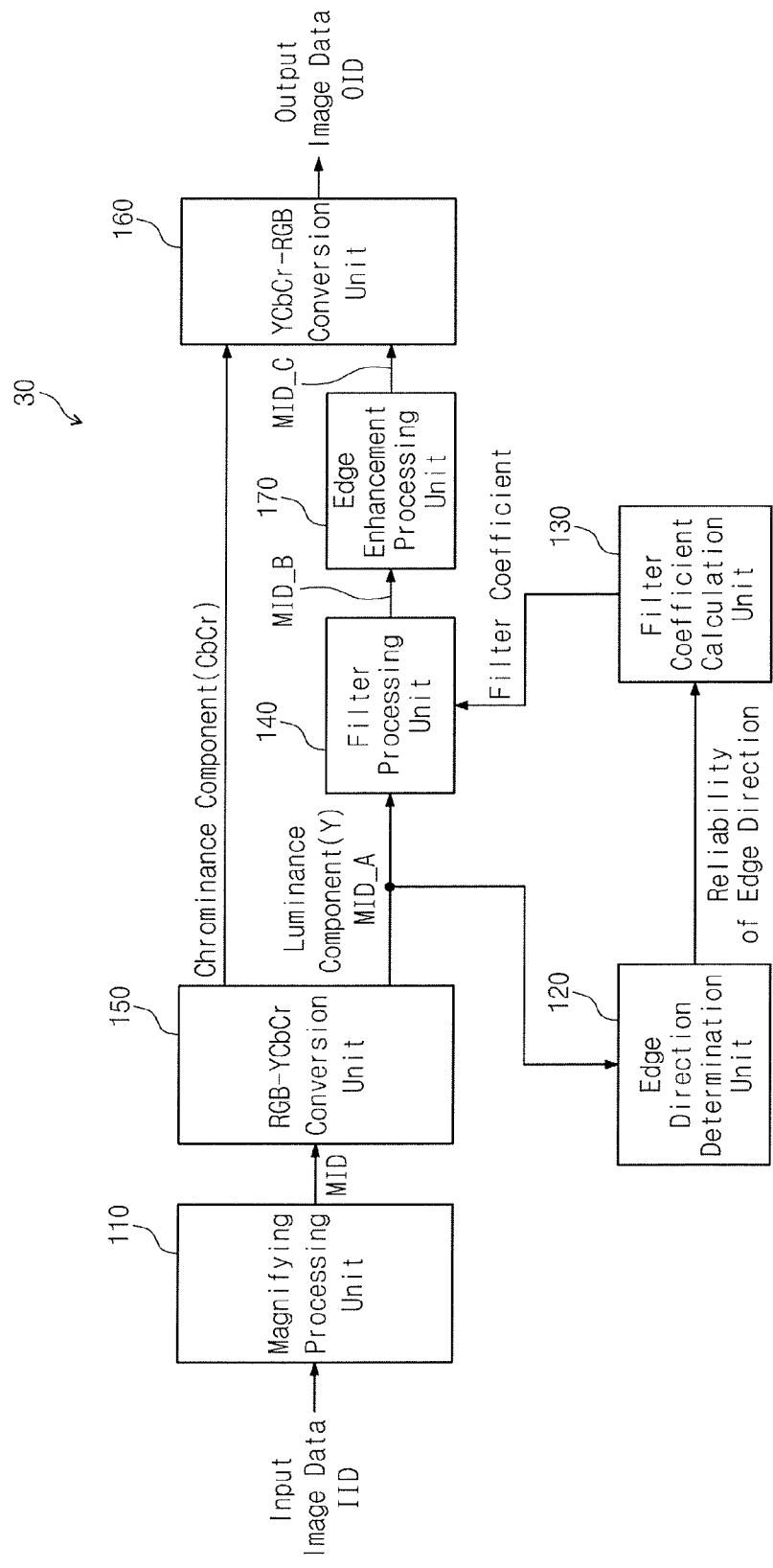
FIG. 16 is a block diagram illustrating an image processing device according to an embodiment of the inventive present concept.

FIG. 16 is a block diagram illustrating the image processing device 30 according to an embodiment of the present inventive concept. Referring to FIG. 16, the image processing device 30 may determine an edge direction using a luminance component Y of each pixel of the magnified image data MID, calculates a reliability value of the corresponding edge direction, calculates a filter coefficient using the determined edge direction and the reliability value of the edge direction, and performs filter processing on the luminance component Y of the corresponding pixel based on the calculated filter coefficient. The image processing device 30 according to an embodiment of the present inventive concept may further include an edge enhancement processing unit 170. Hereinafter, descriptions of the image processing device 30 of FIG. 16 will be focused on differences from the image processing device 20 of FIG. 15. Thus, duplicate descriptions will be omitted.

The edge enhancement processing unit 170 performs filter processing on image data to enhance an edge of the image data. For example, a Laplacian filter may be used for the filter processing, but an embodiment of the present inventive concept is not limited thereto. The edge enhancement processing unit 170 may output image data (e.g., MID_C) obtained by performing the filter processing on magnified image data MID_B to an YCbCr-RGB conversion unit 160. Referring to FIG. 16, the edge enhancement processing unit 170 may perform the filter processing for edge enhancement on luminance component Y of the magnified image data MID_B output from a filter processing unit 140. For example, the magnified image data MID_B output from the filter processing unit 140 may be obtained by performing the filter processing for reducing jaggies on the image data MID_A input to the filter processing unit 140.

The image processing device 30 enhances an edge of the magnified image data MID_B using the edge enhancement processing unit 170. The magnified image data MID_B may be image data whose edge has been blurred through the filter processing unit 140. Thus, output image data OID having a relatively sharpened edge may be output from the image processing device 30.

When the filter processing for edge enhancement is performed on image data, artifacts in the image data may be enhanced. The image processing device 30 may occurrence of mis-interpolation at a portion where edges intersect with each other. Therefore, occurrence of an artifact in which an edge is cut due to the mis-interpolation may be reduced.

Figure 17:
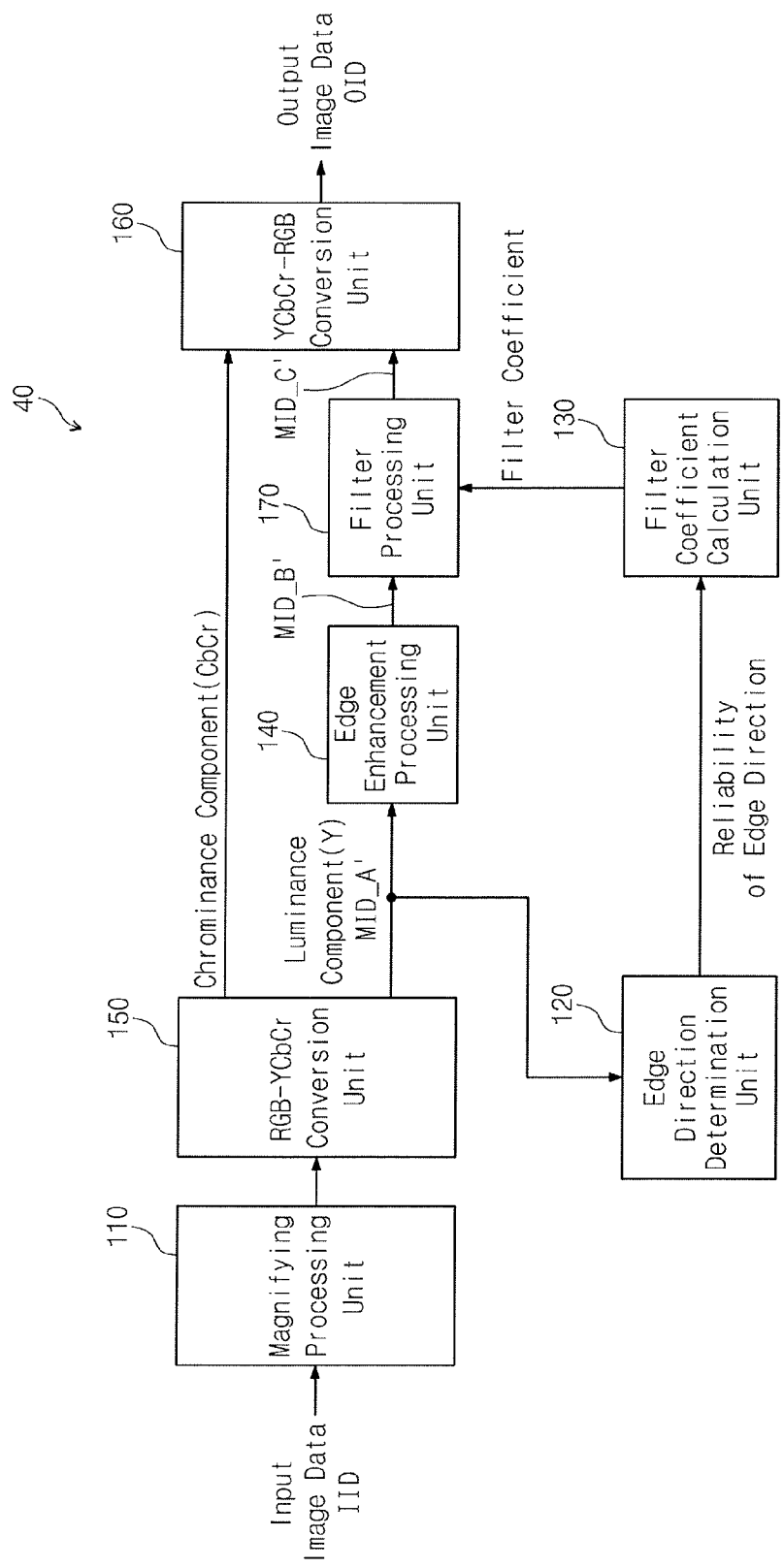
FIG. 17 is a block diagram illustrating an image processing device according to an embodiment of the present inventive concept.

FIG. 17 is a block diagram illustrating an image processing device 40 according to an embodiment of the present inventive concept. In the image processing device 30 illustrated in FIG. 16, the edge enhancement processing unit 170 is disposed at the rear of the filter processing unit 140. In the image processing device 40 illustrated in FIG. 17, the edge enhancement processing unit 170 may be disposed at the front of the filter processing unit 140.

The edge enhancement processing unit 170 of the image processing device 40 performs the filter processing for edge enhancement on luminance component Y of magnified image data MID_A' output from the RGB-YCbCr conversion unit 150. In addition, the edge enhancement processing unit 170 outputs the luminance component Y of magnified image data MID_B' obtained by performing the filter processing for edge enhancement on the magnified image data MID_A'.

The filter processing unit 140 performs filter processing for reducing jaggier on the luminance component Y of the magnified image data MID_B' obtained by performing the filter processing for edge enhancement on the magnified image data MID_A', and outputs the filtered image data as magnified image data MID_C' to the YCbCr-RGB conversion unit 160.

In the image processing device 40, an edge in the magnified image data (e.g., MID_A') is enhanced in advance by the edge enhancement processing unit 170. Therefore, after the filter processing by the filter processing unit 140 is performed on the magnified image data (e.g., MID_B'), the output image data OID of the image processing device 40 may maintain a sharp edge.

Since the filter processing by the filter processing unit 140 is performed after edge enhancement by the edge enhancement processing unit 170, occurrence of an artifact may be reduced at a portion where edges intersect with each other.

In an embodiment of the present inventive concept, the edge enhancement processing unit 170 may be added to the image processing device 20 illustrated in FIG. 15, but an embodiment of the present inventive concept is not limited thereto. In an embodiment of the present inventive concept, the edge enhancement processing unit 170 may be added to the image processing device 10 illustrated in FIG. 4. In an exemplary embodiment of the present inventive concept, referring to FIG. 4 or 15, the edge enhancement processing unit 170 may be disposed at the front of the filter processing unit 140. In an exemplary embodiment of the present inventive concept, referring to FIG. 4 or 15, the edge enhancement processing unit 170 may be disposed at the rear of the filter processing unit 140.

The image processing devices 30 and 40 described with reference to FIGS. 16 and 17, respectively may include an element (e.g., the edge enhancement processing unit 170) that performs the filter processing for enhancing an edge of the magnified image data.

As described above, the image processing device (e.g., 10 of FIG. 4) according to an embodiment of the present inventive concept sequentially uses (e.g., set) each pixel of the magnified image data MID as a pixel of interest, and calculates an edge direction of an edge corresponding to the pixel of interest and a reliability value of the calculated edge direction on the basis of a pixel value (e.g., a luminance value) of the pixel of interest and pixel values (e.g., luminance values) of peripheral pixels of the pixel of interest. In addition, the image processing device (e.g., 10 of FIG. 4) calculates a filter coefficient for each pixel of the magnified image data MID on the basis of the calculated edge direction and the reliability value thereof, and performs filter processing on the magnified image data MID on the basis of the filter coefficient.

For example, in the image processing device (e.g., 10 of FIG. 4) according to an embodiment of the present inventive concept, the reliability value of the edge direction of the edge corresponding to the pixel of interest is compensated on the basis of the edge direction of the edge corresponding to the pixel of interest and the edge direction of the edge corresponding to a peripheral pixel, as described above with reference to FIG. 10.

Thus, the reliability value of an edge direction and the filter coefficient with respect to a pixel where edges of different directions intersect with each other as shown in FIG. 3 is smaller than those with respect to a pixel where an edge extends in a single direction as shown in FIG. 2. For example, in the image processing device (e.g., 10 of FIG. 4) according to an embodiment of the present inventive concept, a pixel where edges intersect with each other is less affected by filter processing than a pixel where an edge extends in a single direction is.

Therefore, the image processing device (e.g., 10 of FIG. 4) according to an embodiment of the present inventive concept may reduce occurrence of mis-interpolation at the portion v13 where a plurality of edges intersect with each other as shown in FIG. 3, and may reduce occurrence of an artifact in which an edge is cut due to the mis-interpolation. For example, according to the image processing device (e.g., 10 of FIG. 4), occurrence of the mis-interpolation may be reduced at the portion v13 where a plurality of edges intersect with each other, and thus, jaggies in image data may further be reduced.

As described above, exemplary embodiments of the present inventive concept include an image processing device, an image processing method, and a program for reducing occurrences of mis-interpolation and jaggies in image data.

While exemplary embodiments of the present inventive concept have been particularly shown and described, it will be understood that various changes in form and details may be made therein without departing from the spirit and scope as defined by the following claims.

What is claimed is:

1. An image processing device comprising:
a first processor configured to:
determine a first edge direction of an edge including a first pixel of input image data, by calculating a first correlation value between a first block having a block length including the first pixel and at least one second block having the same block length positioned along the first edge direction with respect to the first pixel, calculating a second correlation value between the first block and at least one third block positioned along a second edge direction with respect to the first pixel, and determining the first edge direction based on a comparison result of the first correlation value with the second correlation value;
calculate a first filter coefficient bT corresponding to the first pixel, a second filter coefficient bL corresponding to a second pixel of the input image data, and a third filter coefficient bR corresponding to a third pixel of the input image data at least based on a first reliability value of the first edge direction; and
perform filter processing on the input image data on the basis of the calculated first through third filter coefficients, and output output image data,
wherein the first processor compensates for the first reliability value of the first edge direction on the basis of a first weight and a second weight, wherein the first weight is calculated based on a difference between the first edge direction of the edge including the first pixel and a third edge direction of an edge including a peripheral pixel of the first pixel, wherein the peripheral pixel is disposed within a predetermined distance with respect to the first pixel, wherein the second weight is calculated according to a distance between the first pixel and the peripheral pixel.

2. The image processing device of claim 1, wherein locations of the first block and the at least one second block are preset in the input image data for the first edge direction, wherein the first processor calculates pixel value differences between pixels of the first block and pixels of the at least one second block, and calculates the first correlation value on the basis of the pixel value differences.

3. The image processing device of claim 2, wherein the first processor calculates the first correlation value on the basis of an average of the pixel value differences calculated between the pixels of the first block and the pixels of the at least one second block.

4. The image processing device of claim 1, wherein the first processor determines the first edge direction when the first correlation value is smaller than the second correlation value.

5. The image processing device of claim 4, wherein the first processor calculates the first reliability value on the basis of the first correlation value.

6. The image processing device of claim 1, wherein the first correlation value is based on a pixel value difference between the first pixel and a pixel of the second block, and the block length.

7. The image processing device of claim 6, wherein the first correlation value is further based on a block number of the second block.

8. The image processing device of claim 1, wherein the first processor calculates the second filter coefficient bL based on the first reliability value, a second reliability value of a fourth edge direction of an edge including the second pixel, and a third weight corresponding to the second pixel, and wherein the first processor calculates the third filter coefficient bR based on the first reliability value, a third reliability value of a fifth edge direction of an edge including the third pixel, and a fourth weight corresponding to the third pixel, wherein the first pixel, the second pixel, and the third pixel are positioned along the first edge direction, and wherein the second pixel is disposed in an opposite direction to the third pixel with respect to the first pixel.

9. The image processing device of claim 8, wherein the first processor calculates the third weight on the basis of a difference between the first edge direction and the fourth edge direction.

10. The image processing device of claim 9, wherein the first processor calculates a fourth weight on the basis of a difference between the first edge direction and the fifth edge direction.

11. The image processing device of claim 10, wherein the first processor calculates the first filter coefficient bT, the second filter coefficient bL, and the third filter coefficient bR on the basis of the following equation, wherein relT is the first reliability value of the first edge direction, weiL is the third weight, relL is the second reliability value of the fourth edge direction, weiR is the fourth weight, relR is the third reliability value of the fifth edge direction, bT=1+relT, bL=−relT*weiL*relL, and bR=relT*weiR*relR.

12. The image processing device of claim 11, wherein the first processor calculates a pixel value Yout of a pixel of the output image data corresponding to the first pixel of the input image data on the basis of a pixel value YT of the first pixel, a pixel value YL of the second pixel, a pixel value YR of the third pixel, the first filter coefficient bT, the second filter coefficient bL, and the third filter coefficient bR using the following equation, $$Yout = \frac{bL \times YL + bT \times YT + bR \times YR}{bL + bT + bR}.$$

13. The image processing device of claim 1, wherein the first processor calculates the first reliability value of the first edge direction on the basis of a correlation value between a luminance component of a pixel of the first block and a luminance component of a pixel of the at least one second block, and wherein the first processor performs the filter processing on a luminance component of the input image data on the basis of the first through third filter coefficients calculated for the first pixel.

14. The image processing device of claim 1, further comprising a second processor configured to perform edge enhancement processing on the input image data.

15. The image processing device of claim 14, wherein the first processor performs the filter processing on image data on which the edge enhancement processing has been performed by the second processor.

16. The image processing device of claim 14, wherein the second processor performs the edge enhancement processing on image data on which the filter processing has been performed by the first processor.

17. The image processing device of claim 14, wherein the second processor performs the edge enhancement processing on a luminance component of the input image data.

18. The image processing device of claim 1, further comprising a second processor configured to convert first image data having a first resolution into second image data having a second resolution higher than the first resolution, and output the second image data as the input image data.

19. A method of processing an image comprising:
determining a first edge direction of an edge including a first pixel of input image data by calculating a first correlation value between a first block having a block length including the first pixel and at least one second block having the same block length positioned along the first edge direction with respect to the first pixel, calculating a second correlation value between the first block including the first pixel and at least one third block positioned along a second edge direction with respect to the first pixel, and determining the first edge direction based on a comparison result of the first correlation value with the second correlation value;
calculating a first filter coefficient corresponding to first pixel, a second filter coefficient corresponding to a second pixel of the input image data, and a third filter coefficient corresponding to a third pixel of the input image data at least based on a first reliability value of the first edge direction; and
performing filter processing on the input image data on the basis of the calculated first through third filter coefficients calculated for the first pixel to generate output image data,
wherein the first correlation value is based on a pixel value difference between the first pixel and a pixel of the second block, and the block length.

20. An image processing device comprising:
a processor for:
determining a first edge direction of an edge including a first pixel of input image data, a second edge direction of an edge including a second pixel of the input image data, and a third edge direction of an edge including a third pixel of the input image data, and calculating a first reliability value of the first edge direction, a second reliability value of the second edge direction, and a third reliability value of the third edge direction, wherein the first pixel, the second pixel, and the third pixel are positioned along the first edge direction, and the second pixel is disposed in an opposite direction to the third pixel with respect to the first pixel;
calculating first through third filter coefficients, wherein the first filter coefficient is calculated based on the first reliability value, the second filter coefficient is calculated based on the first reliability value, the second reliability value, and a first weight corresponding to the second pixel, and the third filter coefficient is calculated based on the first reliability value, the third reliability value, and a second weight corresponding to the third pixel; and
performing filter processing on the input image data on the basis of the calculated first through third filter coefficients, and outputting output image data,
wherein the processor calculates a correlation value between a first block including the first pixel and at least one second block positioned along a first edge direction with respect to the first pixel, and determines the first edge direction based on the calculated correlation value, and
wherein the processor calculates the correlation value on the basis of an average of luminance value differences between pixels of the first block and pixels of the at least one second block.

* * * * *